United States Patent [19]

Anderson

[11] Patent Number: 4,621,940
[45] Date of Patent: Nov. 11, 1986

[54] STIFF BUT BENDABLE ELONGATED PLASTIC ARTICLE

[75] Inventor: Howard A. Anderson, Pittsburgh, Pa.

[73] Assignee: Mobay Chemical Corporation, Pittsburgh, Pa.

[21] Appl. No.: 652,788

[22] Filed: Sep. 20, 1984

[51] Int. Cl.⁴ .............................................. E01F 9/00
[52] U.S. Cl. ........................................ 404/10; 404/9
[58] Field of Search .................. 404/6, 9, 10, 126, 13; 248/158, 160; 40/606, 608, 610, 612; 138/118, 119, 120, 128, DIG. 7; 52/108; 116/63 R

[56] References Cited

U.S. PATENT DOCUMENTS

| Re. 32,045 | 12/1985 | Schmanski | 404/10 |
| 1,939,968 | 12/1933 | Frei, Jr. | 189/23 |
| 3,295,556 | 1/1967 | Gertsma et al. | 138/128 |
| 3,380,428 | 4/1968 | Abrams | 116/63 |
| 3,838,661 | 10/1974 | Medley, Jr. | 116/63 |
| 4,004,545 | 1/1977 | O'Donnell | 116/63 |
| 4,032,248 | 6/1977 | Parduhn et al. | 404/10 |
| 4,061,435 | 12/1977 | Schmanski et al. | 404/10 |
| 4,084,914 | 4/1978 | Humphrey et al. | 404/10 |
| 4,084,914 | 4/1978 | Humphrey et al. | 404/10 |
| 4,095,618 | 6/1978 | Spencer | 138/118 |
| 4,105,350 | 8/1978 | O'Donnell | 403/2 |
| 4,106,879 | 8/1978 | Diedershagen et al. | 404/10 |
| 4,123,183 | 10/1978 | Ryan | 404/10 |
| 4,126,403 | 11/1978 | Sweeney et al. | 403/2 |
| 4,245,922 | 1/1981 | Auriemma | 404/10 |
| 4,290,712 | 9/1981 | Hayes | 404/10 |
| 4,297,050 | 10/1981 | Gmelch | 404/10 |
| 4,298,292 | 11/1981 | Sweeney | 404/10 |
| 4,299,256 | 10/1981 | Bacehowski et al. | 138/DIG. 7 |
| 4,343,567 | 8/1982 | Sarver et al. | 404/10 |

Primary Examiner—Stephen J. Novosad
Assistant Examiner—Matthew Smith
Attorney, Agent, or Firm—Gene Harsh; Lawrence S. Pope

[57] ABSTRACT

The present application is concerned with an elongated stiff but bendable plastic article which finds particular utility in highway delineators. The article has a central lens shape in the cross-section perpendicular to its longitudinal axis which is formed by joining two sheets along both of their longitudinal edges. The sheets both have parallel longitudinal edges and are configured in an arc in their shorter dimension. A reverse radius is provided in each longitudinal edge just before it joins the similar edge of the other sheet to allow the article to bent 90° across its longitudinal axis in the plane of the sheets' juncture without significant plastic deformation. The article is constructed of a thermoplastic that can sustain substantial elastic deformation.

8 Claims, 2 Drawing Figures

STIFF BUT BENDABLE ELONGATED PLASTIC ARTICLE

FIELD OF THE INVENTION

The present invention is concerned with an elongated article which must display substantial resistance to distortion yet can be repeatedly deformed by bending across its major axis in the plane of its minor axis. Typical of such articles are highway marker posts and gate arms.

BACKGROUND OF THE INVENTION

A number of applications require an elongated article having the contradictory properties of resisting deformation by bending or twisting and yet of being able to withstand repeated flexing along its major axis. Among the more common applications are markers and barriers for traffic control which must be able to withstand being struck by this traffic. Such applications include highway delineator posts like those described in U.S. Pat. Nos. 4,245,922, 4,084,914, 4,298,292 and 4,343,567, gate arms for parking lots, and legs for highway barriers.

The two basic approaches have been unitary articles and mechanical composite articles. The former approach is illustrated in U.S. Pat. Nos. 3,380,428; 4,061,435; 4,123,183; 4,290,712; 4,297,050; 4,298,292; and 4,245,922. These designs often either do not withstand repeated flexing, particularly through 90° along their major axis such as would occur if they were struck by vehicles or they have inadequate resistance to the wind or similar environmental sources of stress. For example, at column 4, lines 28-30 of the 4,298,292 patent acknowledge that ultimate failure upon flexing to be inevitable while the design of the 4,245,922 patent is unable to resist twisting in the wind.

The mechanical composite approach involves multipart assemblies which significantly increase the cost and complexity of these articles. This approach is illustrated in U.S. Pat. Nos. 1,939,968; 3,838,661; 4,004,545; 4,032,248; 4,105,350; 4,106,879; 4,126,403 and 4,343,567.

An interesting blending of the two concepts is illustrated in U.S. Pat. No. 4,084,914. A channel member similar to that illustrated in U.S. Pat. No. 4,245,922 is stiffened against bending or twisting in the wind by bolting a second channel to it. The two channels face each other rather than resting one in the other. The two channel members are preferably constructed of polycarbonate, a rigid thermoplastic material which can undergo substantial elastic deformation. The article requires assembly with bolts or other fasteners and it is not clear that it could withstand repeated 90° deflections without suffering permanent damage.

BRIEF DESCRIPTION OF THE INVENTION

The present invention concerns an elongated article which displays substantial resistance to bending or twisting but which can also be repeatedly deflected through 90° across its major axis in the plane of its minor axis without suffering permanent damage. This article comprises two joined elongated sheets of a rigid thermoplastic material which can undergo significant elastic deformation. Each sheet is formed in the shape at an arc and the arcs are joined along their longitudinal edges to form a lens-like structure in the cross section perpendicular to the major axis of the elongated article with the critical proviso that a reverse radius occurs in each longitudinal edge of each sheet immediately before its joins the longitudinal edge of the other sheet. It is important that this reverse radius, i.e., an arc whose interior faces away from the juncture of the two sheets, is sufficient to allow at least a 90° bend in the elongated article along its major axis without significant plastic deformation occurring. In a preferred embodiment the distance between the two points at which the sheets first join in a cross section perpendicular to the major axis (W) and the maximum distance between the sheets measured in this cross section perpendicular to a line between these points of juncture (H) is related by the formula $W = K \cdot H$ wherein K has a value between about 2 and 4. This limitation geometrically limits the radius of curvature of the two arcs to between about 0.625 and 1.0625 times W. It is also preferred to use a reverse radius of at least about 15 times the sheet thickness. It is further preferred to prepare this article by profile extrusion so that the joined portions of the sheets appear to be essentially a single sheet. A particular interesting variant of this technique is to profile extrude two independent sheets and while the material is still hot enough to be soft join their longitudinal edges by pressing them together. It is finally preferred to minimize the static coefficient of friction between the opposing two inner faces of the lens shape by material selection or by coating these surfaces with a slip aid.

The present invention also concerns a highway delineator which is able to withstand impact with traffic and is self erecting after deflections of 90° or more. The delineator comprises the elongated article described hereinabove with means for securing it to the ground adjacent to the roadway to be marked. These anchoring means may be integral with the elongated article or may be mechanically secured to it. The delineator should be of sufficient length that it can be adequately secured and yet project above the ground enough to be readily visible to those using the highway. The length, width and rigidity of the delineator should be balanced so that it is not easily deflected by anticipated wind loads, so that it can withstand several impacts by a vehicle without sustaining fracture, and so that it readily rights itself after deflection. In general, the wider the W dimension the greater the sheet thickness T should be. In addition a taller delineator may require a greater sheet thickness because of the greater stress on the extreme end of the delineator during deflection, especially by a fast moving vehicle. It is important to minimize the coefficient of static friction between the opposing two faces of the lens shape of the elongated shape if impact with vehicles moving at a high rate of speed are to be survived.

DETAILED DESCRIPTION OF THE INVENTION

Figure 1:
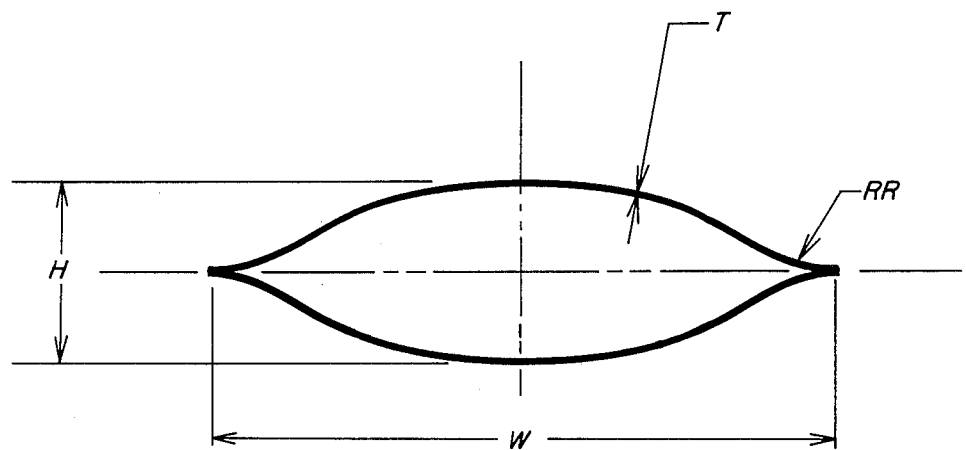
FIG. 1 is a cross section perpendicular to the major axis of an embodiment of the elongated article, wherein the arcs have a radius of curvature of 3.3125 inches, the H dimension is 1.1875 inches, the W dimension is 4 inches, the reverse radius (RR) is 0.5625 inches and the sheet thickness (T) is 0.035 inches.
Figure 2:
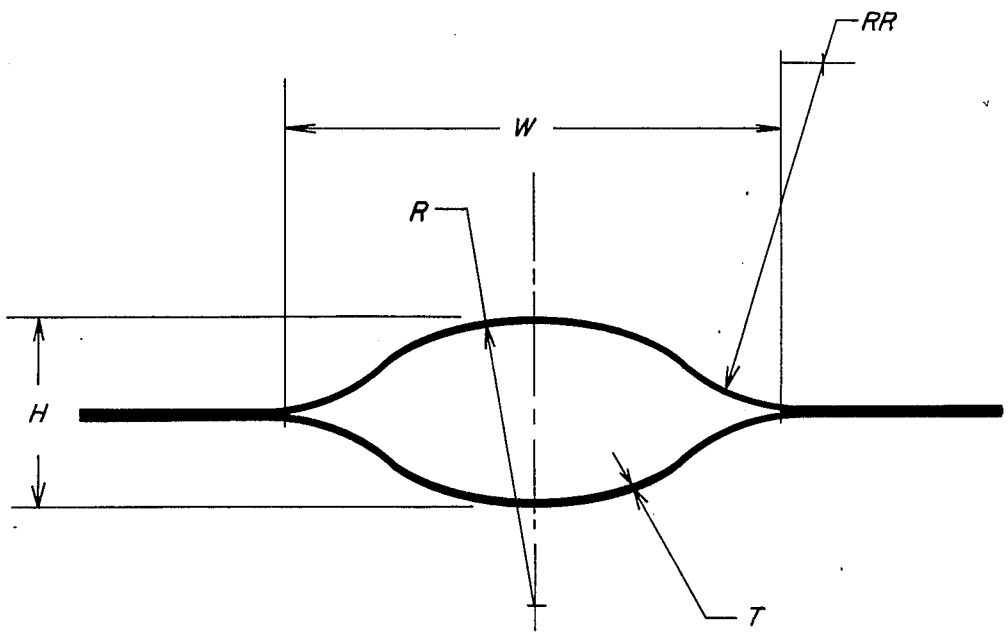
FIG. 2 is a cross section perpendicular to the major axis of two alternative embodiments displaying greater resistance to bending wherein the arcs have a radius of curvature (R) of 0.8 inches for both, the H dimension is 0.56 or 0.75 inches, the W dimension is 1.5 inches when H is 0.56, the reverse radius (RR) is 0.80 inches for the smaller H and 0.437 inches for the larger H, the sheet thickness (T) is either 0.03 or 0.04 inches and total width is 3.0 inches.

The elongated article of the present invention may be prepared from any thermoplastic material which can undergo substantial elastic deformation and which also displays substantial resistance to deformation. Once a design has been selected within the parameters of the present invention well known design engineering principles can be applied to determine the amount of elastic strain which will be required to accommodate a 90° deflection across the major axis in the plane of the minor axis. A suitable material will be able to undergo at least this much elastic deformation. The ability to sustain much greater elastic deformation although not critical is not detrimental. A suitable material will also have a high enough Young's Modulus of Elasticity to resist normal environmental loads such as wind and to return to the unflexed position after bending through 90°. In an application in which the article is initially vertical the material should be capable of storing sufficient elastic energy to lift the portion of the article intended to be deflected to the horizontal back to its initial vertical position. For example, if the article is used in a highway delineator, a material should be selected which can right the delineator after deflection by being run over by a vehicle. The precise amount of elastic strain capacity and elastic deformation resistance needed will depend on the particular design utilized and the application in which the article is used.

Particular suitable materials are the thermoplastic aromatic polycarbonate resins. Among these materials the high molecular weight resins which are based upon 2,2-bis-(4-hydroxyphenyl) propane or bisphenol A and have melt flow rates between 1 and 24, preferably between 1 and 12 grams/10 minutes per ASTM D-1238 are especially suitable. Such suitable resins include both homopolymers and copolymers of bisphenol A and include branched resins such as are described in U.S. Pat. Nos. 3,544,514 and 4,185,009. These resins typically can sustain a strain before substantial plastic deformation occurs of about 8% and have a tensile modulus of about $3.3 \times 10^5$ psi. These materials are available in transparent form so that various indicia can readily be inserted into the hollow lens portion. They can also be obtained in a variety of opaque and translucent colors. Additionally they can be extruded and/or coextruded to give surfaces with multicolor patterns. Those of these polycarbonates which have a notched Izod impact strength of at least 5 ft.-lb. in a ⅛" specimen and which can sustain at least about a 5% elastic strain are especially preferred.

Other well known thermoplastic engineering resins may also be suitable. The polyamide resins based on aliphatic dicarboxylic acids and aliphatic amines or on caprolactam are among these materials. Of particular interest are the nylon 6 and nylon 66 resins. Also of interest are the thermoplastic polyesters such as the polyalkylene terephthalates described in U.S. Pat. No. 3,516,957, blends of these resins with polycarbonate such as described in U.S. Pat. No. 3,218,372 and impact modified versions of these resins such as described in U.S. Pat. No. 4,297,233.

The particular end use to which the elongated article is put may dictate further material requirements. For instance if the article is to be used as a highway delineator it will need good resistance to sudden impact over a wide temperature range and outdoor weathering. A typical test for such an application is being struck by a vehicle travelling at about 50 miles per hour. In some cases it is desired that a delineator survive ten such impacts and still retain its utility. To survive such a test it is advantageous to select a material having a fairly low coefficient of static friction or to modify the interior faces of the lens portion to display such a low coefficient by, for example, spraying them with an appropriate lubricant. The concept is to reduce the amount of stress transmitted when the two walls of the lens portion slide over each other when the article is deflected through 90°.

Among the materials displaying suitability low coefficients of static friction are the thermoplastic aromatic polycarbonates which have been modified to display low blocking behavior as thin films.

Such resins are disclosed in U.S. Pat. Nos. 4,405,731 and 4,454,261 incorporated herein by reference. These materials typically have coefficients of static friction as determined by ASTM D-1894-78 of less than 10, preferably less than 5 and most preferably less than 1 for thin cast films. In this evaluation procedure the coefficient of static friction is determined between the free surfaces of two cast one mil films of the material being evaluated.

Other suitable materials include other synthetic thermoplastic resin compositions which have both the necessary mechanical properties and a low coefficient of static friction between surfaces of the material.

The lubricants which can be applied to the inner surfaces of the lens portion of the article include those dry lubricants which are typically used to enhance release in injection molding thermoplastic resins. A particularly suitable class of such lubricants are the silicone sprays exemplified by Muller Stephenson's MS 122 Release Agent Dry Lubricant.

The two walls defining the lens portion of the elongated article may be joined along their lateral edges in any manner which substantially uniformly transfers stress from one to the other upon flexing or deflection of the article across its major axis in the plane of its minor axis. In this regard on flexing of the article, the wall on the outside of the bend typically exerts a tensile stress on the wall on the inside of the bend seeking to stretch it to an equal length and it is desirable that this tensile stress be transmitted as uniformly as possible. In particular it is important to avoid joining techniques which give rise to substantial localized concentrations of stress such as occur at bolts or rivets.

The article may be formed from two sheets, which have each been formed to contain an appropriate arc which is centrally located in the sheet, which extends across a portion of the width of the sheet and which has its apogee or top extending parallel to the major axis of the sheet. The sheets may be given this configuration by a variety of techniques including thermoforming and profile extrusion. The lateral edges of the sheets are then joined to form a longitudinally extending lens portion between them. Among the techniques which are suitable for joining these edges in a manner which avoids the creation of substantial stress raisers of the type which arise at bolts or rivets are solvent cementing, adhesive bonding, and welding including hot tool welding, hot gas welding, heat sealing, and ultrasonic welding. Solvent cementing has been found to be an especially good technique, particularly with polycarbonate. Another technique of particular interest is to simultaneously profile extrude both sheets separately but simultaneously and then bond the longitudinal edges of the two sheets by pressing them together before the articles cool below a formable temperature.

In an especially preferred technique, the elongated article is created as a unitary shape. The lens portion is then created without the formation and joining of two separate pieces. In a preferred technique the lens portion is created at the same time as the flat sheet portion. A particularly preferred technique is to profile extrude the elongated article. This tends to assure that a uniform bond is formed between each of the side portions in which the lens portion terminates.

The critical features of the elongated article are that it displays stiffness similar to a cylindrical tube but yet is still able to sustain deflections of at least about 90° across its major axis in the plane of its minor axis without suffering substantial plastic deformation. It is believed that the lens portion provides the stiffness while the reverse radius provides the ability to sustain the deflection. Particularly interesting articles are obtained when the ratio between the width and the height of the lens portion is between about 2 and 4, preferably between about 2.5 and 3.5. This stiffness may be further enhanced by extending the area of juncture of the two walls of the lens portion perpendicular to the major axis of the article and in the plane of juncture, i.e., in such a manner that the lens portion and the juncture portions, or wings, may by dissected by a common plane. These wings need only be sufficient to prevent the article from coming apart along this common plane on deflection through 90°. The area of juncture required will depend on the manner of creating the joint and the material out of which the article is created. A preferred design for applications in which stiffness is important involves employing wings whose extension perpendicular to the major axis is between about 0.25 and 0.75 times the width (W) of the lens portion.

A suitable reverse radius can readily be determined by experimentation. Without any reverse radius the elongated article will fail on repeated 90° flexing due to the plastic deformation which occurs in the areas of juncture. Generally a kinking of material, the extent of which will depend on the particular material of construction, will be observed at the two points where the two sides of the lens portion join. This phenomenon can be eliminated by providing a sufficient reverse radius, i.e., an arc with its interior directed away from the lens portion, in each lateral edge of both walls of the lens portion immediately adjacent to the point at which it is joined with the lateral edge of the other wall. The radius of this arc is preferably between about 10 and 30 times the thickness of a wall of the lens portion with a ratio between about 15 and 25 being particularly preferred.

The highway delineator may comprise the elongated article alone or it may also include additional means for securing this article to the ground. In the former case the article should include some integral means for secure attachment to the ground. A preferred embodiment of this concept involves providing an article with wings and providing each wing with portions which each diverge from the plane of the wings by an acute angle. The vertex of each angle should generally point toward the end of the article which is to be inserted into the ground. These barbs can be readily obtained by cutting into each wing at several locations along lines pointing to this end and deflecting the portion of the wing immediately before this incision above or below the plane of the wing by an acute angle.

The delineator may also comprise an appropriate base which can be securely fixed in the ground and which is mechanically attached to the elongated article.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A highway delineator comprising an extruded elongated article which displays substantial resistance to bending or twisting but can be bent 90° across its longitudinal axis and across the plane of juncture of its faces without suffering significant plastic deformation, said article
   (1) being constructed of a thermoplastic aromatic polycarbonate which
      (a) can sustain an elastic strain of in excess of about 5%, and
      (b) displays a notched Izod impact strength of at least about 5 ft-lb. at room temperature in a ⅛" specimen,
   (2) having the shape of two sheets which
      (a) each has two parallel longitudinal edges,
      (b) each has the configuration of an arc with wings in its shorter dimension,
      (c) are joined to each other along both of their longitudinal edges,
      (d) define a lens shape in the cross-section perpendicular to their longitudinal axis which has a width between about 2 and 4 times its height and has wings extending in the plane of juncture of these sheets for a distance of between about 0.25 and 0.75 times the width of the lens shape, and
      (e) each has a reverse curvature at both of its longitudinal edges just before the point of juncture of a radius both at least about fifteen times the thickness of the sheet and sufficient to allow its interior surface to meet the interior surface of the other sheet without significant plastic deformation when the article is bent 90° across its longitudinal axis and across the plane of said juncture, and
   (3) being able to withstand the impact of a vehicle bumper at 50 miles per hour which causes it to bend 90° across its longitudinal axis and across the plane of juncture of these sheets.

2. The highway delineator of claim 1 which will, when secured with its longitudinal axis vertical, self restore after a portion of the elongated article is bent through 90° across its longitudinal axis and across the plane of juncture of the sheets.

3. The highway delineator of claim 2 which is constructed of a thermoplastic aromatic polycarbonate based on bisphenol A having a melt flow between 1 and 24 grams per ten minutes.

4. The highway delineator of claim 2 wherein the extruded elongated article is adapted to be secured to the ground by mechanical attachment to a base.

5. The highway delineator of claim 2 wherein the extruded elongated article has an integral means for securing it to the ground.

6. The highway delineator of claim 5 wherein said integral means comprises portions of the wings which have been deflected out of the plane of the wing by an acute angle with the vertex of the angle generally pointed towards the end of the article to be inserted into the ground.

7. A highway delineator comprising an extruded elongated article which displays substantial resistance to bending or twisting but can be bent 90° across its longitudinal axis and across the plane of juncture of its faces without suffering significant plastic deformation, said article
   (1) being constructed of a rigid thermoplastic material capable of substantial elastic deformation,
   (2) having the shape of two sheets which
      (a) each has two parallel longitudinal edges,
      (b) each has the configuration of an arc with wings in its shorter dimension,
      (c) are joined to each other along both of their longitudinal edges,
      (d) define a lens shape in the cross-section perpendicular to their longitudinal axis which has a width between about 2 and 4 times its height and has wings extending in the plane of juncture of the sheets for a distance of between about 0.25 and 0.75 times the width of the lens shape, and
      (e) each has a reverse curvature just before the point of juncture of a radius both at least fifteen times the thickness of the sheet and sufficient to allow its interior surface to meet the interior surface of the other sheet without significant plastic deformation when the article is bent 90° across its longitudinal axis and across the plane of said juncture, and
   (3) being able to withstand the impact of a vehicle bumper at 50 miles per hour which causes it to bend 90° across its longitudinal axis and across the plane of juncture of these sheets.

8. The highway delineator of claim 1 which will, when secured with its longitudinal axis vertical, self restore after a portion of the elongated article is bent through 90° across its longitudinal axis and across the plane of juncture of the sheets.

* * * * *